Figure 1:
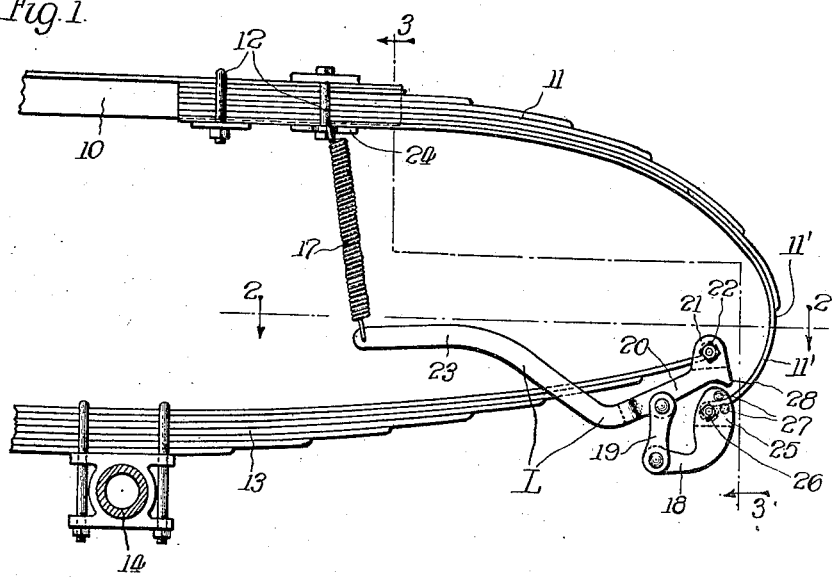

J. M. KERR.
SHOCK ABSORBER.
APPLICATION FILED JULY 14, 1921.

1,417,175.

Patented May 23, 1922.

Witness:
A. J. Sauser.

Inventor:
James M. Kerr,
By Charles J. Schmidt
Atty.

UNITED STATES PATENT OFFICE.

JAMES M. KERR, OF CRAWFORDSVILLE, INDIANA.

SHOCK ABSORBER.

1,417,175.   Specification of Letters Patent.   Patented May 23, 1922.

Application filed July 14, 1921. Serial No. 484,641.

*To all whom it may concern:*

Be it known that I, JAMES M. KERR, a citizen of the United States, and a resident of Crawfordsville, in the county of Montgomery, State of Indiana, have invented certain new and useful Improvements in Shock Absorbers, of which the following is a specification.

My invention relates to shock absorber mechanism which is particularly useful and efficient on automotive vehicles of the side spring type. The important object of the invention is to provide a simple and inexpensive shock absorbing attachment which will efficiently take up and absorb the lesser and short vibration shocks during travel of the vehicle and which will efficiently smooth and pave the way for the operation of the vehicle springs to take up the heavier shocks. Another object of the invention is to provide such construction and arrangement that the recoil or rebound of the vehicle springs will be efficiently braked, snubbed and absorbed. A further object of the invention is to provide construction and arrangement which will permit attachment of the shock absorbing mechanism without interfering with the normal relative position of vehicle springs and without requiring rearrangement or reconstruction of such springs or vehicle parts.

On the accompanying sheet of drawing the construction, application and operation of my improved shock absorbing mechanism is clearly illustrated. On the drawing—

Figure 3:
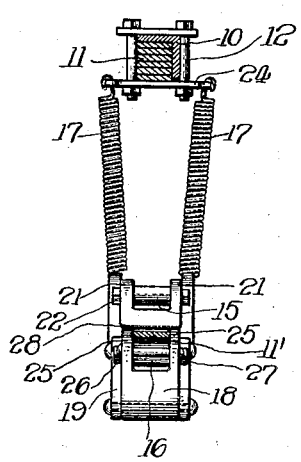
Figure 2:
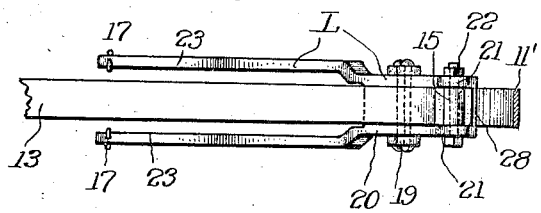

Fig. 1 is a side elevational view of one corner of a vehicle showing the shock absorbing mechanism applied to the vehicle springs, Fig. 2 is a plan view on plane 2—2, Fig. 1 and Fig. 3 is a sectional view on plane 3—3, Fig. 1.

On the drawing 10 represents one of the metal side beams of the vehicle chassis and 11 represents a quarter elliptic spring rigidly secured at its butt end to the front of the beam 10 by means of suitable clamping bolts 12. The semi-elliptic spring 13 is suitably clamped intermediate its ends to the vehicle axle 14, the spring at its inner end being secured to the vehicle chassis in the ordinary manner. At its outer end the spring terminates in an eye 15, the scroll end 11' of the spring 11 extending downwardly a distance below the eye 15 and terminating in the eye 16. In the normal construction of the vehicle, these eyes are connected by a shackle member which is, however, removed to permit application of my improved shock absorbing mechanism. The shock absorber mechanism comprises the lever structure indicated as a whole by L, the shock absorbing springs 17, the fitting 18, and the shackle 19, this shackle being the one which normally directly connects together the ends of the vehicle springs. The lever member may be formed integral of steel or malleable iron or may be otherwise constructed. The lever shown has the body part 20 from whose outer end extend the ears 21 spaced sufficiently far apart to receive between them the eye 15 of the vehicle spring 13, the bolt 22 extending through the eye and ears to thus fulcrum the lever on the spring 13. Extending parallelly from the other end of the body part are the arms 23 spaced apart to receive between them the spring 13, the ends of the arms being connected by the shock absorber springs 17 with the vehicle body. These shock absorber springs may be anchored in any suitable way on the vehicle body. As shown, they hook on a plate 24 which is held in place by the bolts 12 which secure the vehicle spring 11 to the chassis frame.

The shackle 19 is pivoted to and hangs from the body 20 of the lever member and at its lower end is pivoted to the inner end of the fitting 18 which is secured to and forms an extension of the spring 11. The fitting has the ears 25 which receive between them the eye 16 of the spring 11 and the bolt 26 extends through the ears and the eye, pins 27 extending through the ears at either side of the spring to assist the bolt in rigidly holding the fitting on the spring end. The dimensions of the fitting 18 and the distance of the shackle 19 from the fulcrum end of the lever L is such that the ends of the vehicle springs 11 and 13 will be practically in the same relative position as they had been in the original vehicle when such ends were connected directly by the shackle member. In the arrangement shown the end of spring 13 is practically directly above the end of the spring 11.

The upper end of the fitting 18 is rounded as shown to form an abutment, and on the heel of the lever L outside the vertical fulcrum line is the abutment ridge or lug 28. The adjustment of the shock absorber springs 17 is such that normally the fitting 18 will be spaced away from the lever member L a distance, and the abutment 28 will be at the outside of the vertical line passing through the pivot ends of the vehicle spring. The arms 23 also curve upwardly diagonally away from the body 20 so as to normally be in greater part above the vehicle spring 13, the body 20 being below the spring.

Describing the operation, as the vehicle travels over a roadway the lesser shocks are practically all taken up by the absorber mechanism, the vehicle springs in separating and moving apart at their ends causing rocking of the lever L against the tension of the springs 17. The heavier shocks are first transmitted to the shock absorbing attachment and eventually taken up by the vehicle springs, the abruptness of the shocks being absorbed by the absorber mechanism.

The shock absorber mechanism also operates sufficiently to gradually break and snub the recoil or rebound of the vehicle after heavy compression of the vehicle springs. While the vehicle springs are under load, the ends thereof are in vertical alinement, but as the load is suddenly removed the released vehicle springs will return toward their normal curvature, their ends moving in opposite directions, so that when the springs separate after release of the load the top of the fitting 18 will engage the abutment heel 28 on the lever 13. Such engagement will tend to rotate the lever but such rotation is resisted by the springs 17 and thus the recoil or rebound movement is primarily caught by the springs 17 and the movement gradually braked and snubbed. After the springs 17 have accomplished the preliminary braking and snubbing operation, the vehicle springs themselves will come into play to fully snub the rebound movement. Thus under practically all conditions of travel of the vehicle the shock absorber attachment is effective to ease, absorb and snub the various shocks, the absorbing springs 17 co-operating with the vehicle springs to cause the vehicle to travel smoothly and with the greatest degree of comfort to the occupants.

The arms of the lever member are comparatively long so that comparatively light springs 17 will, on account of the lever advantage, exert the required lifting force on the body through the shackle 19, fitting 18 and the spring 11. It is evident that the lever L could have only one arm 23 or a number of such arms, each connected by a spring 17 with the vehicle body. By having two arms and two springs the structure is well balanced, the arms receiving the vehicle spring 13 between them.

My shock absorbing apparatus can be applied without in any wise requiring any reconstruction or change on the vehicle other than taking out the shackle which ordinarily connects together the vehicle spring ends. The fitting 18 is secured by means of the bolt 16 and the pins 27 which do not require any changes on the spring 11. Likewise anchorage of the spring 17 is accomplished by merely slipping the plate 24 underneath the nuts of one or more of the clamping bolts for the spring 11.

Having described my invention, I claim the following:

1. In a vehicle, the combination of an upper vehicle spring secured to the vehicle body and extending outwardly and downwardly therefrom, a lower vehicle spring secured to the vehicle axle and terminating above the end of said upper spring, a lever fulcrumed on the end of said axle spring and extending toward said axle, a shock absorbing spring connecting between the inner end of said lever and the vehicle body, an abutment on said lever outside of its fulcrum point, an abutment on the end of the upper spring normally inside of said lever abutment, a link connecting between said upper spring abutment and the lever at a point inside of the lever fulcrum, said link connection causing rocking of said lever when said springs approach each other, and said abutments engaging with each other to rock the lever when the springs move away from each other.

2. In a vehicle, the combination of an upper side spring secured to the vehicle body and extending outwardly and downwardly therefrom, a lower vehicle side spring secured to the vehicle axle and terminating at its end above the end of the upper spring, a lever fulcrumed near its outer end on the end of the axle spring and extending toward said axle, a shock absorbing spring connected between the inner end of said lever and the vehicle body, an extension on the outer end of said upper spring normally disposed with its upper end below the fulcrum point of said lever, a link connecting between the inner end of said extension and said lever inside of the lever fulcrum, compression of said springs causing rocking of said lever against the tension of said shock absorbing spring, said vehicle springs relaxing after a certain degree of separation thereof to bring said extension below said lever outside of its fulcrum point whereupon said extension will engage with said lever outside of its fulcrum point and cause rocking thereof and cause said shock absorbing springs to become effective.

3. In a vehicle, the combination with a lower vehicle side spring secured to the axle, an upper vehicle spring secured to the vehicle body and curving outwardly and downwardly to terminate below the end of the axle spring, a lever pivoted at its outer end on the end of said axle spring and extending inwardly, a shock absorbing spring connected with the inner end of said lever and the vehicle body, an extension on the end of said upper vehicle spring, a link connecting the inner end of said extension with said lever a short distance inside of the lever fulcrum point, said extension and lever being out of contact during compression movements of said vehicle springs, an abutment heel on said lever outside of its fulcrum point, abnormal separation of said vehicle springs permitting relaxation thereof and shifting of said fulcrum point and extension to bring said extension below said abutment heel and into engagement therewith to rock said lever whereby said shock absorbing spring will become effective to retard and absorb rebound shocks.

4. In a vehicle, the combination of a semi-elliptic spring secured on the vehicle axle, a quarter elliptic spring secured at its butt end to the vehicle body and extending outwardly and downwardly to terminate below the end of the axle spring, a shock absorber lever fulcrumed at its outer end on the end of the axle spring and extending inwardly, an elastic connection between the inner end of said lever and the vehicle body for resisting downward swing of said lever, an extension on the end of said quarter elliptic spring, a shackle connecting between the inner end of said extension and said lever inside of but comparatively close to the lever fulcrum point whereby compression of said spring will cause rocking of said lever, an abutment lug on said lever outside of its fulcrum point normally out of register with said extension, said springs relaxing after a certain degree of separation thereof whereby said fulcrum point and extension will shift to bring said abutment lug into registration with said extension to permit engagement of said extension with said abutment and rocking of said lever during extraordinary separation of the springs.

5. In a vehicle, the combination of an upper side spring secured to the vehicle body, a lower side spring secured to the vehicle axle and terminating above the end of the upper spring, a lever fulcrumed at its outer end on the outer end of said axle spring and extending inwardly, an elastic connection between the inner end of said lever and the vehicle body for resisting downward swing of the lever, a fitting secured to the outer end of the upper spring and extending downwardly and inwardly below said lever, a link connecting the inner end of said fitting with said lever intermediate its ends, an abutment point on said lever outside of its fulcrum point normally out of register with the top of said fitting, relaxation of said vehicle springs during abnormal separation thereof causing said fitting and abutment point to come into register and into engagement to effect swing of said lever and operation of the elastic connection to resist such swing to thereby break and snub the separation movement of said springs.

6. In a vehicle, the combination of an upper vehicle spring secured to the vehicle body, a lower vehicle spring secured to the vehicle axle and terminating above the end of the upper spring, a shock absorber lever fulcrumed at its outer end on the end of said axle spring and extending downwardly a distance below said spring and then inwardly alongside of and above the spring, an elastic connection between the inner end of said lever and the vehicle body for resisting downward swing of the lever, an extension fitting secured on the end of said upper spring and extending downwardly and inwardly below the lever, a link connecting the inner end of said extension with said lever inside of but close to the fulcrum point thereof, an abutment point on the lower end of said lever outside of its fulcrum point, said abutment point and fitting being normally out of vertical register, relaxation of said vehicle springs during abnormal separation thereof causing said abutment point and fitting to shift into vertical register and permitting engagement thereof to effect swing of said lever and operation of the elastic connection whereby shocks otherwise due to separation of the vehicle springs will be snubbed and absorbed.

7. In a vehicle, the combination of an upper spring secured to the vehicle body and extending outwardly and downwardly therefrom, a lower vehicle spring secured to the vehicle axis and terminating above the end of the upper spring, a lever fulcrumed on the end of said axle spring and extending toward said axle, a shock absorbing spring connected at one end to the inner end of said lever and rigidly anchored at its other end, an abutment on said lever outside of its fulcrum point, an abutment on the end of the upper spring, the end of said upper spring connecting with said lever at a point inside of the lever fulcrum, said lever being rocked when said springs approach each other and said abutments engaging with each other to rock the lever when the springs move away from each other, said shock absorbing spring resisting swing of said lever.

In witness whereof, I hereunto subscribe my name this 9 day of July, A. D. 1921.

JAMES M. KERR.